Patented Nov. 15, 1938

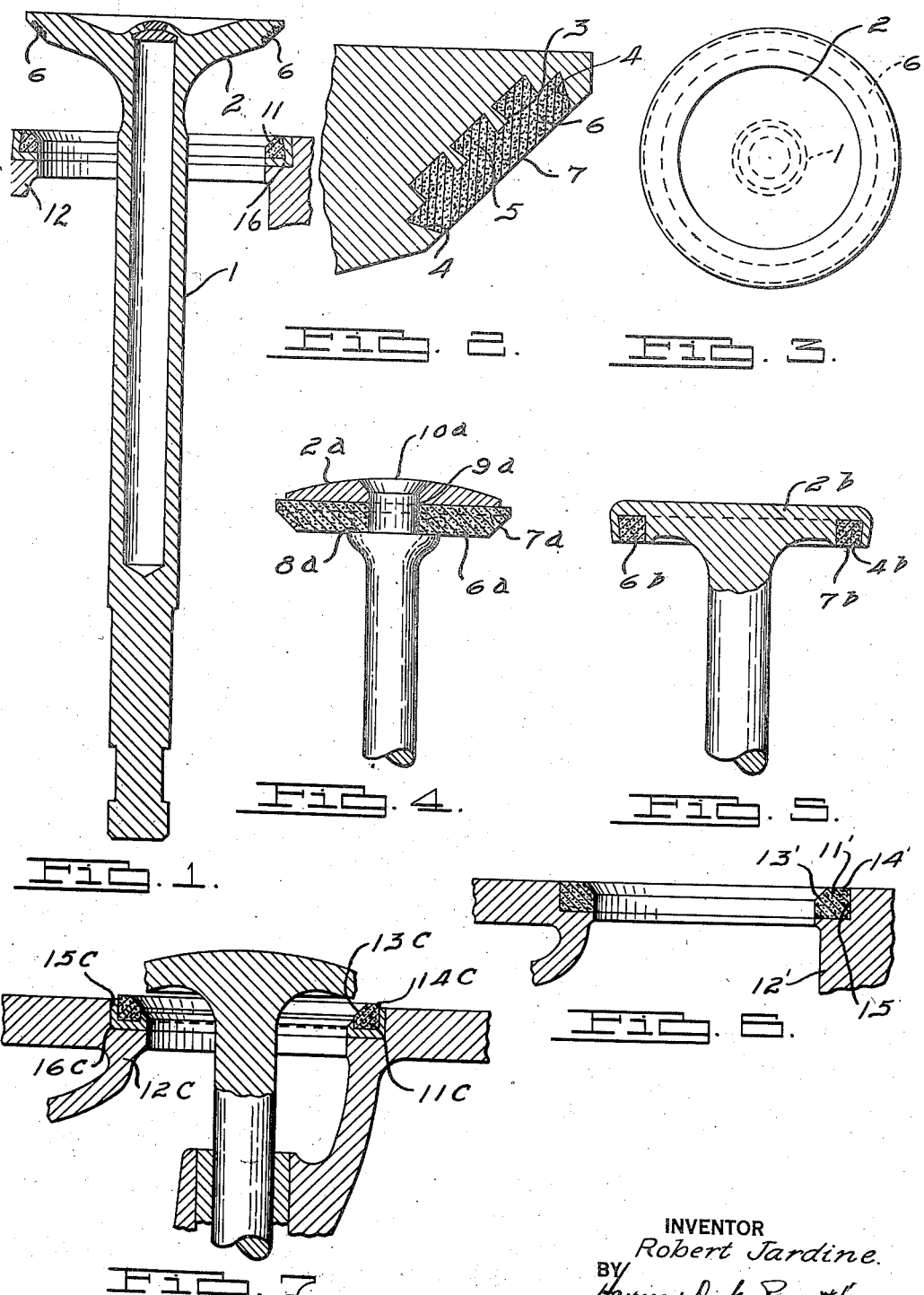

2,136,690

UNITED STATES PATENT OFFICE 2,136,690

INTERNAL COMBUSTION ENGINE VALVE AND SEAT

Robert Jardine, Detroit, Mich., assignor, by mesne assignments, to Eaton Manufacturing Company, Cleveland, Ohio, a corporation of Ohio Application August 12, 1930, Serial No. 474,742

4 Claims. (Cl. 123—188)

Although the present invention is broadly entitled, it relates more particularly to the provision of suitably hard and durable fit-retaining and heat-conductive engagement surfaces upon valves and/or valve seats; and preferred embodiments may involve not only the use of special compositions but special methods and means of producing suitable annuli of said compositions, and means and methods of retaining the same in place.

It is well known that although the properties of cast and other irons and steels render these suitable for structural use in engines and engine valves, the escape of compressed and hot combustion gases between the cooperating engagement surfaces provided by tappet valve organizations tends toward a rapid local corrosion or erosion or pitting or like deterioration thereof; and this invention aims to retain the advantages of ferrous metals in the construction of engine blocks and valve bodies while nevertheless obviating the disadvantages of said ferrous metals by forming the seats of valves and/or the cooperating valve surfaces of special and resistant materials such as to obviate leakage past said valves,—the mentioned engagement surfaces being, for example, formed from a substance which provides a reticulum or continuum or matrix of tough and conductive metal (preferably including copper) in and by which finely sub-divided particles of an exceedingly hard and resistant material (such as tungsten) are so distributed and held as not only to protect said continuum or matrix but substantially to obviate, or greatly to retard, deterioration of the cooperating engagement surfaces.

Other objects of the present invention may be best appreciated from the following descriptions of illustrative embodiments thereof, taken in connection with the appended claims and the accompanying drawing.

Fig. 1 is a vertical section of a valve showing one embodiment of the invention.

Fig. 2 is an enlarged detailed view corresponding to an upper right-hand portion of Fig. 1.

Fig. 3 is a top plan view of the valve shown in Fig. 1.

Fig. 4 is a view corresponding to the upper portion of Fig. 1 but showing a valve head in which an annulus of resistant material has the form of a disc.

Fig. 5 is a detailed view suggesting the employment of a flat-faced annular unit in a groove in a valve head.

Figs. 6 and 7 suggest different modes of employment of special composition annuli fixed in valve seats, as hereinafter described.

Referring first to Figs. 1 and 2, valve stem 1 and head or body portion 2 may be formed of any of the conventional steels now used or of any metal that may be preferred for the purpose. A groove 3 is shown as provided in a bevelled surface of the valve head; and this groove may be provided with outwardly converging side walls 4 and/or with grooves or recesses 5 in its bottom. To provide therein an annulus 6, having a hard and smooth engagement surface or seat facing portion 7 of resistant material (in preference to merely "painting-on" a special composition and then heating) the mentioned groove 3 and/or recesses 5 may be filled with a mixture adapted to form, upon suitable heating, a structure of materials which will retain hardness and resist wear when subjected even to severe conditions of use and which is a good conductor of heat. This structure may, for example, include a matrix or continuum of a non-ferrous metal such as copper, nickel and/or cobalt having finely sub-divided tungsten thoroughly disseminated therethrough,—the formed unit being incidentally or previously consolidated by pressure and being fused, pressed or otherwise permanently secured to the presumably ferrous metal body of the valve or valve seat.

As to alternative physical forms, in Fig. 4 it is suggested that a disc 6a, preformed of resistant material of the general character described, be retained between a valve head element 2a and a shoulder 8a upon the upper end of a valve stem,—an extention 9a of this stem being shown as swaged or headed down within a suitably flared opening in the body 2a and an engagement surface 7a being shown as beveled similarly to the mentioned surface 7, Fig. 1.

In Fig. 5 it is suggested that a resistant annulus 6b, providing a downwardly-facing flat engagement surface 7b, be seated as an insert welded in a suitable groove 4b in the head 2b. In Fig. 6 a substantially similar annulus 11' is shown as provided in a groove in an engine block 12'. This annulus may be provided with an inclined surface 13', suitable for engagement with an inclined surface such as 7 or 7a, and/or with a flat engagement surface 14'; and it may extend to or above the top of a groove 15', in the engine block suitably for cooperation with a flat surface such as that provided at 7b, in Fig. 5.

In the form shown in Fig. 7, characters corresponding to those applied to Fig. 6 being similarly used but with an added "c", an additional element in the form of a channel 16c is employed. The use of this feature, which may be made of steel or cast iron either upon a head annulus or a seat annulus, will be seen to permit the annuli to be preformed in, or separately from, channel elements and to provide protected units whose engagement surfaces may be formed exactly true and which are capable of becoming separate articles of commerce and being variously used,—as by merely securing the channel elements thereof into grooves such as one of the grooves 4b, 15c. Although such operations as that last referred to may be effected while cooperating engagement surfaces are in mutual contact and under a suitable pressure, and although relative rotation might be relied upon for a grinding effect, and although either or both of a cooperating pair of engagement surfaces may be provided or equipped as described, it is believed that no further details are required to an understanding of the mechanical features of the present invention, except as relates to optional taper effects.

As to its chemical or metallurgical features, it is entirely possible that other substances having similar qualities of hardness and resistance to wear and corrosion at high temperatures and capable of admixture with or retention by a suitable matrix metal or metals can be partially or completely substituted for the expensive tungsten,—having resisting qualities superior to both the ferrous body and the substantially non-ferrous matrix but non-fusible with either. In this connection mention may be made of various carbides and so-called carborundum products which, if divided with sufficient fineness and/or containing enough carbon to qualify the abrasive characteristics of their silicon content, might be substituted for some or all of the tungsten content of the described composition.

Among alternative methods apparently available, mention may be made of such processes as the compression of powdered tungsten into the desired form with powdered copper retained on top of it, the unit being put and kept for a time in a hydrogen gas furnace at such a temperature as to melt the copper, allowing it to flow into the spaces between the particles of tungsten. Alternatively, tungsten carbide and cobalt may be employed for consolidation in the described general manner,—requiring, however, a much higher temperature. When resistance to excessively high temperatures is not required, powdered copper or bronze may be employed, being heated sufficiently to cause the conductive particles to sinter or stick together to form the mentioned reticulum or matrix; and similar results might be obtained by the use of a reticulum-forming mixture such as oxide of copper and tin,—making a bronze when flowed together. The use of reducing gas may be dispensed with in these latter cases, providing the application of heat and pressure are suitably prolonged; and a simple process, such as that first referred to, in which a paste, containing the copper or other non-ferrous matrix in powdered form and powdered tungsten or its equivalent, is pressed into a groove in the seat or valve face or into a suitable channel element, the whole being then heated under pressure until the copper or other matrix metal coalesces about the resistant particles and the impregnated unit becomes fused or permanently bonded to the adjacent body of steel or other structural metal, may ordinarily be adequate. The matrix metal, as thus used, will be so protected as to resist oxidation and will conduct heat rapidly away from the steel body in which the unit is secured,—the tungsten particles serving not only to obviate wear but to protect the conductive continuum or matrix.

Referring now to valve seat features suggested in Fig. 1, the tapers therein shown are found suitable to a special method of securing annuli in valve parts,—such as valve heads or blocks provided with corresponding openings. Cylindrical annular elements having recently been chilled to contract the same before pressing the same into place, to effect a tight fit at the periphery thereof, additional effects are herein secured by providing a conical or like taper in each annular element,—the taper diagrammatically shown in channel annulus 16 preferably amounting to something like five thousandths of an inch and a similar or greater taper being optionally provided in an inner annulus 11. These annuli 16 may be respectively formed from steel or cast iron and from a special steel or composition such as stellite; and the mentioned tapers are intended primarily to insure tight joints between not only peripheral but transverse surfaces such as those of the mentioned annuli and any head or body receiving the same.

Liquid air having heretofore been used to produce a temporary shrinkage of an inner part, to facilitate assembly while nevertheless assuring subsequent peripheral tightness, an important advance is effected by this suggested taper,—rendering the subsequent expansion of each inner annular element, (cooled to a temperature far below that of its prospective use and inserted in an opening which provides both a curved side wall and a transverse or bottom wall) effective so to force the inner element "inward" as to apply a high axial pressure to and through the flat or other inner face thereof.

This novel construction and method of assembly will be seen also to favor heat conduction through all contacting surfaces; and use of cast iron in the ring 16 (whether the inner annulus 11 includes comparatively fragile material such as tungsten or a less fragile material such as stellite) assures not only protection of the inner annulus but tightness between the various pairs of cooperating surfaces at all temperatures of use,—the channel 16 preferably having substantially the same coefficient of expansion as has the engine block or head receiving the same.

Although the foregoing description has included mention of a variety of alternative physical forms and a variety of compositions and methods, it should be understood not only that various features of the present invention might be independently employed but also that numerous modifications, additional to any herein suggested, might easily be devised by skilled workers if informed of the foregoing,—all without departure from the scope of the present invention as the latter is indicated in the following claims:

I claim:

1. In a valve seat unit for the poppet valves of internal combustion engines, a bi-metallic annulus having a downwardly and inwardly beveled surface forming a seat for the poppet valve of an internal combustion engine, said annulus embodying a metallic attaching base ring and an initially separate and harder metallic impact right embedded in the base ring and having a beveled upper surface constituting said seat, a portion of said base ring being in overhanging confining relation to said impact ring.

2. In a valve seat unit for application to an internal combustion engine casting, a bi-metallic annulus having a tough metallic attaching ring having a recess opening out through one end and the inner peripheral wall thereof and a hard metal impact ring in said recess and surrounded on the inner and outer edges and on the base side thereof by the tough metal of the attaching ring.

3. In a valve seat unit of the type applied to internal combustion engine castings, a bi-metallic annulus embodying a metallic attaching outer ring of a metal tougher than that of the engine casting to which the bi-metallic annulus is to be applied, and a harder metal inner impact ring embedded in the attaching outer ring and bounded on the base, inner and outer sides thereof by the tough metal of the attaching ring.

4. In an inserted valve seat for poppet valves of internal combustion engines, an impact ring, and a base ring underlying the impact ring and having a recess snugly receiving the impact ring, and having an outer wall in closely embracing and overhanging relation to a portion of the impact ring to cooperate with the underlying portion of the base ring in securing the impact ring in place.

ROBERT JARDINE.